United States Patent [19]

Stoev et al.

[11] 4,184,965

[45] Jan. 22, 1980

[54] VIBRO-ACOUSTICAL EXTRACTION APPARATUS

[75] Inventors: Stoycho M. Stoev; Marin D. Mitrushev; Grozdan T. Boshilov; Maria G. Radeva, all of Sofia, Bulgaria

[73] Assignee: Vish Minno-Geoloshki Institute-Nis, Sofia, Bulgaria

[21] Appl. No.: 747,721

[22] Filed: Dec. 6, 1976

Related U.S. Application Data

[63] Continuation-in-part of Ser. No. 572,342, Apr. 28, 1975, abandoned.

[51] Int. Cl.² .............................................. B01D 35/20
[52] U.S. Cl. ................................ 210/388; 209/365 R
[58] Field of Search ............... 210/388, 384, 319, 385, 210/DIG. 18; 209/269, 309, 365 R, 365 B, 382, 233, 1

[56] References Cited

U.S. PATENT DOCUMENTS

| | | | |
|---|---|---|---|
| 2,514,159 | 7/1950 | Jönsson | 210/384 |
| 2,684,154 | 7/1954 | Daman | 209/269 |

*Primary Examiner*—Frank Sever

[57] ABSTRACT

Extraction apparatus wherein solid and liquid phases are subjected to vibro-acoustical action in order to intensify the extraction process. The apparatus includes an enclosure forming a working perforated vessel, spring means mounting such vessel for vibratory movement, a vibrator mounted on the vessel to vibrate it, two laterally displaced feeding openings for receiving, respectively, solid particulate material and liquid, two spaced discharge outlets on the cell for discharging, respectively, solid material and liquid.

1 Claim, 1 Drawing Figure

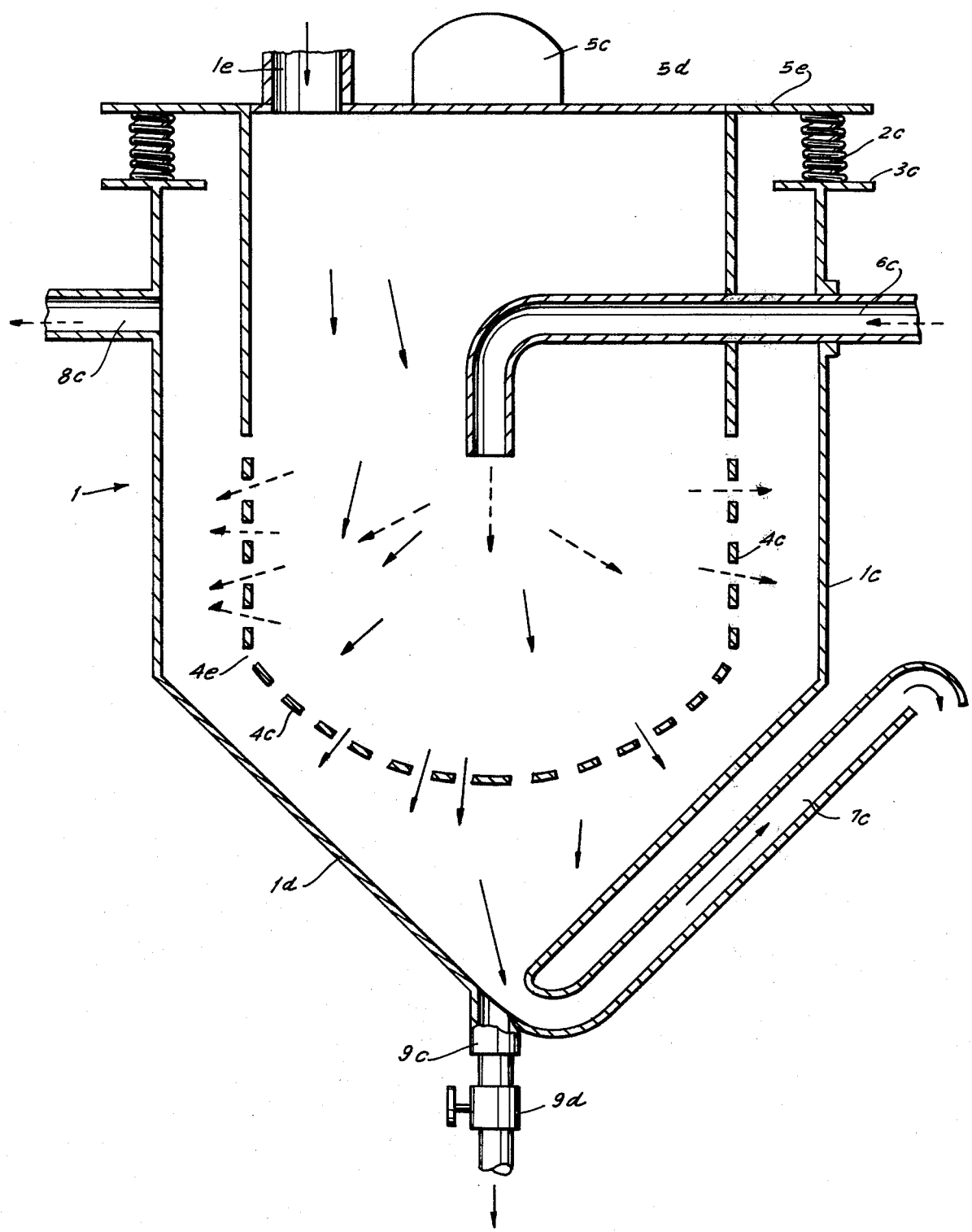

VIBRO-ACOUSTICAL EXTRACTION APPARATUS

CROSS REFERENCE TO RELATED APPLICATION

This application is a continuation-in-part of our copending patent application Ser. No. 572,342 filed on Apr. 28, 1975, now abandoned and entitled VIBRO-ACOUSTICAL EXTRACTION APPARATUS.

This invention relates to extraction apparatus, and more particularly to apparatus wherein solid and liquid phases are subjected to vibro-acoustical action in order to intensify the extraction process.

Prior extraction apparatus operate by means of mechanical, pneumatic or pulsation mixing of the solid and liquid phases. The common disadvantages of these devices is that they cannot assure a rapid removal of the products of reactions in the boundary layers. Because of this, the processes are of comparatively low velocity, i.e., of relatively low output.

Another disadvantage of the presently available prior extractors is that they require the use of large quantities of metal and are of large volume, so that high capital investments are necessary to build them. The driving means for such prior extractors are relatively complex, which makes their maintenance difficult and costly, and complicates automation of the process.

The present invention has among its objects the provision of an extracting apparatus which is free from the above-outlined disadvantages of the prior art.

In accordance with the present invention there is provided an extraction apparatus which functions by vibration action on mixtures of solid and liquid phases to be treated, with a resultant rapid removal of the products of the reactions in boundary layers. In accordance with the invention there is a working cell provided with a vibrator, the cell and vibrator being mounted on springs supported on a fixed foundation. The apparatus has two feeding and two discharging openings, and a screen is installed inside it. The advantage of the apparatus of the invention is that it assures rapid removal of the products of reactions in the boundary layers, and thus makes possible a process which proceeds at a high velocity and produces high outputs.

One preferred embodiment of the vibration extractor of the inventions is shown in the accompanying drawing, wherein the single FIGURE is a schematic view in cross section of the vibration extractor with a perforated vessel mounted within the cell.

Turning to the drawing there is illustrated a working cell 1 which has an upper portion 1c the lower end of which communicates with a portion 1d. The lower end of the portion 1d of the working cell 1 is connected to an upwardly and outwardly solid material discharge conduit means 7c. Also attached to the lower end of the portion 1d of the cell, but displaced laterally somewhat from the inlet end of the pulp discharge conduit 7c there is a downwardly extending solid material discharge conduit means 9c having a selectively operable shut-off valve 9d interposed therein. Disposed within the working cell 1 coaxial thereof and suspended from its upper wall is a vessel 4c having perforated side walls with openings 4e spaced somewhat from the side walls of the portion 1c, 1d of the working cell.

A vibrator 5c is mounted on the upper wall 5d of the working cell. The working cell 1 is stationary and has an upper platform 3c. A plurality of springs 2c are supported on the platform 3c. The outwardly projecting wall 5e, which is integral with the top wall 5d, rests on the springs 2c. The vibrator 5c may impart vertical linear, rotary movements or combinations thereof to the vessel 4c depending on the materials processed by the apparatus.

A particulate solid material is fed into the vessel or chamber 4c through an inlet conduit means 1e, as shown. Liquid is fed into the working cell through a conduit means 6c disposed adjacent the upper end of the cell.

The apparatus shown in the drawing operates as follows: When the vibrator 5c is switched on, the perforated wall vessel 4c is set in motion. As shown, liquid introduced through the conduit means 6c finds its way through the perforations 4e in the side wall of the vessel 4c along the path indicated by the dash arrows. Solid particulate material likewise passes through such perforations 4e from the interior of vessel 4c into the cell 1 proper and thence to the lower entrance end of the discharge conduit means 7c or 9c. The paths taken by the solid particulate material are indicated by solid line arrows.

The vibrator 5c is preferably of a known construction, and may subject the vessel 4c to vibrations either in vertical linear or rotary direction or combinations thereof. Such vibrator may employ, for example, a driven shaft journalled in a structure secured to the top wall 5d of the vessel 4c, there being an eccentrically disposed weight secured to the shaft.

The solid material fed through inlet conduit means 1e is subjected to vertical linear or rotary vibratory movements depending on the type of material being processed. Particulate raw materials which disintegrate under frequent collisions should be subjected to vertical linear vibrations by means of an electromagnetic vibrator. Those raw materials which are processed and effectively treated by collisions and frictional contact are subjected to rotary vibrating movements from an inertia type vibrator which generates circular vibrations. The operating liquid, fed through conduit means 6c penetrates into the solid phase, flows through it while the whole mass is vibrated, and the resultant mixture flows out through the openings 4e and enters the space between the vessel 4c and the cell 1. From there that part of the mixture which is sufficiently fluid leaves the apparatus through pulp discharge conduit means 9c. The solid phase of the mixture which has been rapidly densified leaves the apparatus through discharge conduit 9c. The discharge conduit 7c also serves to discharge fluid phases when the apparatus is cyclically operated. Working liquid leaves the apparatus through discharge conduit 8c.

There follows now four examples:

EXAMPLE 1

Quartz sand for manufacturing glass is subjected to treatment. The iron content of the sand is 0.35% wt and is in the form of a membrane on the sand particles. An inertia type vibrator is used which produces circular vibrations of about 47 herz frequency and about 1.42 mm amplitude. A rotary vibrating movement is produced in the vessel 4c which causes a destruction of the aforementioned iron membranes and the formation of slime due to the penetration of the introduced water into the sand mass. The formed slime is discharged through the discharge conduit means 8c. The cleaned sand mass, free of the iron forming membrane, is discharged through the conduit 9c and has a maximum iron content of 0.012% wt.

EXAMPLE 2

It should be noted that when the vessel 4c is small and there is not an unduly large pneumatic resistance the whole process may be carried out dry. In such a case a dry sand is fed into the vessel 4c through conduit 1e and air is blown in through conduit 6c. The frictional contact of the sand particles in vessel 4c destroys the iron membranes and clean sand particles are blown out through conduit 9c. The impure air is discharged through conduit 8c.

EXAMPLE 3

A solution containing 3 grams of copper per liter of solution is subjected to a cementation treatment. Iron balls or iron particles are fed into the vessel 4c via conduit 1e. The copper containing solution is fed into the cell via the conduit 6c. Copper of 99.6% wt can be extracted in 15 seconds if the vessel 4c is vibrated at 100 herz frequency with an amplitude of 0.6 mm.

EXAMPLE 4

A sand having a 4.9% wt clay content is to be processed. The vessel 4c is vibrated at 47 herz frequency with an amplitude of 2.4 mm. The clay quickly becomes soluble in the fed in water with which it is carried out through outlet tube 8c. The purified sand, having a maximum clay content of 0.2% wt, is delivered through outlet conduit 9c.

The extractors of the invention are useful in many different applications: In the washing of mineral surfaces for the removal of clay and other films therefrom, in hydrometallurgical treatments (the solid phase is the respective mineral raw material, and the liquid one is the respective leaching solution), and in ion-exchange technologies (the solid phase being the ion-exchange resin or metal, and the liquid phase being the corresponding liquid).

Although the invention is illustrated and described with reference to one preferred embodiment thereof, it is to be expressly understood that it is in no way limited to the disclosure of such preferred embodiment, but is capable of numerous modifications within the scope of the appended claims.

What is claimed is:
1. An apparatus for extraction, comprising in combination,
    an enclosure forming a working cell with imperforate walls;
    spring means mounted on said working cell;
    a vessel having perforated side walls mounted on said spring means inside said working cell for vibratory movement, said vessel forming an independent chamber within said working cell;
    a vibrator mounted on said vessel and adapted to impart to said vessel a vibratory movement;
    said working cell having a first, outlet conduit for discharging fluid from said working cell and said vessel having a second, inlet conduit extending through the wall of said working cell and the perforated side wall of said vessel for feeding liquid into said vessel;
    an upwardly inclined pulp discharge conduit means leading from the bottom of said cell to a raised discharge orifice;
    said pulp discharge conduit being dimensioned to discharge pulp above the level of the lowest point of said vessel.
    a solid material discharge conduit means connected to said cell adjacent to the bottom thereof;
    a feeding solid material conduit mounted on the top of the vessel; and
    a selectively operable shut-off valve operatively mounted on said solid discharge conduit means.

* * * * *